US011798073B2

(12) United States Patent
Vanegas et al.

(10) Patent No.: US 11,798,073 B2
(45) Date of Patent: Oct. 24, 2023

(54) BLOCKCHAIN DIGITAL CRYPTOCURRENCY LOAN SYSTEM

(71) Applicants: Maurice Vanegas, Sun Valley, CA (US); Isaac Vanegas, Sun Valley, CA (US); Pranay Bhattacharyya, Newbury Park, CA (US)

(72) Inventors: Maurice Vanegas, Sun Valley, CA (US); Isaac Vanegas, Sun Valley, CA (US); Pranay Bhattacharyya, Newbury Park, CA (US)

( * ) Notice: Subject to any disclaimer, the term of this patent is extended or adjusted under 35 U.S.C. 154(b) by 0 days.

(21) Appl. No.: 17/415,607

(22) PCT Filed: Apr. 16, 2020

(86) PCT No.: PCT/US2020/028594
§ 371 (c)(1),
(2) Date: Jun. 17, 2021

(87) PCT Pub. No.: WO2021/211131
PCT Pub. Date: Oct. 21, 2021

(65) Prior Publication Data
US 2023/0025000 A1 Jan. 26, 2023

(51) Int. Cl.
*G06Q 40/02* (2023.01)
*G06Q 20/06* (2012.01)
*G06Q 20/36* (2012.01)

(52) U.S. Cl.
CPC .......... *G06Q 40/02* (2013.01); *G06Q 20/065* (2013.01); *G06Q 20/36* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 11,068,978 | B1 * | 7/2021 | Ferreira | H04L 9/3239 |
| 11,423,474 | B1 * | 8/2022 | Ribeiro | H04L 9/50 |
| 2012/0246060 | A1 | 9/2012 | Conyack, Jr. et al. | |
| 2017/0243025 | A1 * | 8/2017 | Kurian | H04L 9/3236 |
| 2018/0075421 | A1 * | 3/2018 | Serrano | H04L 63/061 |

(Continued)

FOREIGN PATENT DOCUMENTS

| | | | | |
|---|---|---|---|---|
| CN | 111242786 A * | 6/2020 | | G06F 16/27 |
| WO | WO-2012134927 A1 * | 10/2012 | | G06Q 40/02 |

(Continued)

OTHER PUBLICATIONS

Google Patents English Language Translation of CN-111242786-A. Printed on Mar. 10, 2023. https://patents.google.com/patent/CN111242786A/en?oq=CN-111242786-A (Year: 2023).*
Google Patents English Language Translation of WO-2021062160-A1. Printed on Mar. 10, 2023. https://patents.google.com/patent/WO2021062160A1/en?oq=WO-2021062160-A1 (Year: 2023).*
Digital Wallet Explained: Types With Examples and How it Works by Julia Kagan. https://www.investopedia.com/terms/d/digital-wallet.asp (Year: 2022).*

(Continued)

*Primary Examiner* — Ayal I. Sharon
(74) *Attorney, Agent, or Firm* — THE WEBB LAW FIRM

(57) ABSTRACT

A cryptographic blockchain computer network digital cryptocurrency loan system that rewards both the loan holder and the loan paying network users with system utility fund tokens for each loan payment made. System utility fund tokens entitle the system users to receive dividend distributions of passive income from a system digital cryptocurrency investment fund.

9 Claims, 9 Drawing Sheets

(56) References Cited

U.S. PATENT DOCUMENTS

| | | |
|---|---|---|
| 2018/0075527 A1 | 3/2018 | Nagla et al. |
| 2018/0165758 A1 | 6/2018 | Saxena et al. |
| 2018/0247191 A1 | 8/2018 | Katz et al. |
| 2019/0027259 A1 | 1/2019 | Pulitzer et al. |
| 2019/0164221 A1* | 5/2019 | Hill ................. G06Q 40/03 |
| 2019/0220831 A1* | 7/2019 | Rangarajan ........ H04L 9/3239 |
| 2019/0259025 A1* | 8/2019 | Hilton ............... G06Q 20/227 |
| 2019/0272591 A1* | 9/2019 | Leonard ............ G06Q 20/405 |
| 2020/0042989 A1* | 2/2020 | Ramadoss .......... G06Q 20/065 |
| 2020/0143466 A1* | 5/2020 | Wu ................... H04L 9/3239 |
| 2020/0294128 A1* | 9/2020 | Cella ................. H04L 9/3239 |
| 2020/0302315 A1* | 9/2020 | Golding ............. G06N 20/00 |
| 2021/0065293 A1* | 3/2021 | Sigler ................ G06Q 20/24 |
| 2021/0082044 A1* | 3/2021 | Sliwka ............... H04L 9/3255 |
| 2021/0287285 A1* | 9/2021 | Yan ................... H04L 9/3239 |
| 2021/0295320 A1* | 9/2021 | Yan ................... G06Q 20/40 |
| 2021/0312545 A1* | 10/2021 | Ferreira .............. G06Q 40/03 |
| 2022/0207605 A1* | 6/2022 | Yan ................... G06Q 20/3678 |
| 2022/0230240 A1* | 7/2022 | Sliwka ............... G06N 7/01 |
| 2022/0351195 A1* | 11/2022 | Quigley .............. G06Q 20/36 |

FOREIGN PATENT DOCUMENTS

| | | | |
|---|---|---|---|
| WO | WO-2017132450 A1 * | 8/2017 | ............ G06Q 20/02 |
| WO | 2019246565 A1 | 12/2019 | |
| WO | WO-2021062160 A1 * | 4/2021 | ........ G06F 16/2365 |

OTHER PUBLICATIONS

Blockchain, Explained Reviewed by Luke Fortney Updated Feb. 10, 2019. https://web.archive.org/web/20190324151616/https://www.investopedia.com/terms/b/blockchain.asp (Year: 2019).*

Bitcoin Reviewed by Jake Frankenfield Updated Feb. 20, 2019. https://web.archive.org/web/20190328034123/https://www.investopedia.com/terms/b/bitcoin.asp (Year: 2019).*

"What is cryptocurrency EOS and how does it work?" https://kriptomat.io/cryptocurrencies/eos/what-is-eos/ Kriptomat © 2023 (Year: 2023).*

"EOS Tokens Defined: The Basics and Examples". https://www.investopedia.com/tech/what-is-eos/ by Shobhit Seth Updated Aug. 7, 2021. (Year: 2021).*

* cited by examiner

Lender Digital Wallet = $DW_{LH}$
Borrower Digital Wallet = $DW_P$
Agent Digital Wallet = $DW_A$
System Digital Wallet = $DW_{SYS}$
DC Investment Fund Digital Wallet = $DW_{IF}$

BLOCKCHAIN DIGITAL CRYPTOCURRENCY LOAN SYSTEM

TECHNICAL FIELD

The present invention is in the field of data processing systems for digital cryptocurrency loan creation and payment. More specifically data processing in relation to systems involving a loan creation and payment protocol on a delegated proof of stake peer-to-peer blockchain computer network.

DISCLOSURE OF THE INVENTION

As used herein the term currency refers to a transferable object that may be accepted as payment for goods and services and repayment of debts between parties. Most currency objects today are fiat currencies. A currency object may be a tangible physical object or may be an intangible object existing as stored information.

A fiat currency object, like a paper currency bill, is without useful value itself as a commodity. The fiat currency object derives its value by being declared by the governing authority of a jurisdiction to be legal tender in that jurisdiction; that is, the fiat currency object must be accepted as a form of payment within the jurisdiction of the governing authority. Accordingly, merchants in the governing authority's jurisdiction readily accept payment for their goods and services with fiat currency objects because they know that they can in turn pay for goods and services in that jurisdiction with such fiat currency objects. However, the modern fiat currency objects of today are not the only type of currency objects.

Historically, the first type of currency objects developed were commodity items. A commodity item currency object consists of a physical commodity item that has an intrinsic value in itself. A common type of commodity item used historically as a currency object was precious metals, typically gold or silver. A governing authority would often make metal currency coins by placing a mark on the metal that served as a guarantee of the weight and purity of the metal. With a commodity item currency object, the commodity item object will retain its intrinsic value as a commodity item even if it is not used as a medium of exchange to pay for goods or services. Thus, for example, a commodity currency object that is a gold coin will still retain the value of the gold even if it is melted down and no longer a coin.

Evolving from the use of commodity object currencies were representative currency objects. Merchants or banks would issue written receipts to their depositors which were exchangeable for physical commodity items deposited with them (e.g. gold or silver coins). Such paper receipts became accepted as a means of payment by merchants. Merchants could exchange the receipt they had received in payment for the commodity items deposited with the issuing merchant or bank. Such privately issued written receipts used as a medium of exchange came to be a currency object known as a representative currency object. Representative currency objects helped commercial parties to a transaction avoid the inconvenience and expense of having to store, secure, transport and exchange typically heavier and bulkier physical commodity currency objects when conducting their transactions.

The written receipts issued by private banks exchangeable for commodity items deposited in the bank evolved into what came to be known as the banknote. A written banknote is a type of negotiable promissory note, made by a bank, that any bearer of the banknote can exchange on demand for the physical commodity items on deposit with the issuing bank. Banknotes were originally issued by private commercial banks, who were legally required by the governing authority of the jurisdiction that they operated in to exchange the banknotes for the legal tender of the governing authority (usually gold or silver coins minted by the governing authority) whenever the banknote was presented to the chief cashier of the issuing bank. The commercial banknotes traded at face value in the markets served by the issuing bank. The commercial banks issuing banknotes thus had to ensure that they could always pay customers in legal tender (e.g. the precious metal coins minted by the governing authority) when a person presented commercial banknotes for payment.

Eventually, national banknotes issued by the central banks of the governing authority for a jurisdiction came to mostly replace the private commercial banknotes. In contrast to a private commercial bank, a governing authority central bank possesses a monopoly on increasing the monetary base in the governing authority's jurisdiction, and also mints the currency objects which serve as legal tender in the governing authority's jurisdiction.

Historically, many governing authority central banks also followed the practice of basing their central bank banknotes with a commodity item, most often gold or silver. Thus, a money system that was a "gold standard" was one in which the governing authority issued currency objects (e.g. paper bills) that could be exchanged on demand into a fixed amount of gold from the governing authority. Today for a variety of economic reasons most governing authorities (i.e. governments) have abandoned commodity-based standards like the gold standard for their currencies: Most government issued currency objects have no basing in commodities and are simply fiat currencies.

While legal tender fiat currency embodiments issued by the central banks of governments have come to dominate the modern economy they are not the only currencies. Commercially issued currency objects can still exist where not prohibited by the law of a governing authority. One example in particular is the development and use of digital cryptocurrency objects in recent decades.

A digital cryptocurrency is a form of currency that is embodied only in an intangible digital or electronic form, and not in a tangible physical form. It is also called digital money, electronic money, electronic currency, or cyber cash.

Digital cryptocurrency objects are intangible and can only be owned and transacted in by using computers or digital wallets which are connected to the Internet or the designated networks. In contrast, the physical embodiment currency objects, like bank notes and minted coins, are tangible and transactions are possible only by holders who have physical possession of such currency objects.

Like any standard fiat currency, digital cryptocurrency objects can be used to purchase goods as well as to pay for services from those willing to accept such digital cryptocurrency objects as payment. Digital cryptocurrency objects allow for instantaneous transactions that can be seamlessly executed for making payments across borders when connected to supported devices and networks. For instance, it is possible for an American to make payments in a digital cryptocurrency embodiment to a distant counterparty residing in Switzerland, provided that they both are connected to the same network required for transacting in the digital cryptocurrency object.

Digital cryptocurrency objects offer numerous advantages. As payments in digital cryptocurrency objects are made directly between the transacting parties without the need of any intermediaries, the transactions are usually instantaneous and zero- to low-cost. This fares better compared to traditional payment methods that involve banks or clearing houses. Digital cryptocurrency object based electronic transactions also bring in the necessary record keeping and transparency in dealings.

A cryptocurrency object is a type of digital cryptocurrency object which uses cryptography to secure and verify transactions and to manage and control the creation of new currency units. Bitcoin, Ethereum and EOS are some of the most popular cryptocurrency objects.

The present invention is a digital cryptocurrency (hereinafter "DC") loan creation and payment system for use on a peer-to-peer (hereinafter "P2P") blockchain computer. In a preferred embodiment the system of the present invention is deployed onto the EOSIO P2P network delegated proof of stake (hereinafter "DPoS") public blockchain network that was established by the company Block.one and which is generally known as the EOS Mainnet (hereinafter "EOS Mainnet"). The DC of the EOS Mainnet is the EOS.

Every user of the EOS Mainnet must have a user digital wallet software application (hereinafter "$DW_{USER}$") that stores data which includes unique public and private cryptographic keys of the user. It is through $DW_{USER}$ that a user interfaces with and conducts transactions on the EOS Mainnet, and can check the user balances of EOS and other cryptographic tokens (e.g. utility tokens of network applications) that are recorded on the EOS Mainnet blockchain.

Preferably $DW_{USER}$ is a WEB3 digital wallet. WEB3 digital wallet is a self-custody digital wallet (i.e. one that is in the possession of the wallet owner, as opposed to the wallet being stored elsewhere on a third-party server) which stores the user cryptographic keys and also has a browser which can interface with the third generation of the World Wide Web (i.e. "WEB3"), including for the usage of a decentralized applications (hereinafter "dApp") running on a P2P blockchain network such as the EOS Mainnet.

The EOS Mainnet is a DPoS blockchain network where the block producing nodes are selected by a voting process of EOS Mainnet users who have "staked" EOS with the EOS Mainnet. Staked EOS (hereinafter "$EOS_{ST}$") is EOS that is immoveable (i.e. "parked") on the EOS Mainnet and which can't be used by a user for conducting transactions on the EOS Mainnet, such as making payments. The EOS staked by a $DW_{USER}$ (hereinafter "$EOS_{ST-USER}$") will still belong to $DW_{USER}$. After a certain maturity period of time $EOS_{ST-USER}$ can be "unstaked" by $DW_{USER}$ so that it can again be used by $DW_{USER}$ for conducting network transactions, such as making payments. For as long as a $DW_{USER}$ has $EOS_{ST-USER}$ it entitles the $DW_{USER}$ to vote by nominating up to thirty EOS Mainnet block producer candidates. Each nominated block producer candidate will receive the $EOS_{ST-USER}$ of $DW_{USER}$ as votes. $DW_{USER}$ can also set up another network user as a proxy to exercise the votes.

On the EOS Mainnet for any transaction submitted by a $DW_{USER}$ to be processed and added to the EOS Mainnet blockchain the $DW_{USER}$ must have a sufficient quantity of $EOS_{ST-USER}$ to access the EOS Mainnet network resources (e.g. the RAM, CPU and NET resources of the network nodes) which are required to process the transaction. A $DW_{USER}$ on the EOS Mainnet is entitled to an exclusive percentage of EOS Mainnet network resources that is equal to the $DW_{USER}$ percentage of total Mainnet staked EOS ("$EOS_{ST-TOTAL}$"):

% EOS Mainnet Network Resources$_{(DW_{USER})}$= $EOS_{ST-USER}/EOS_{ST-TOTAL}$

Thus, by way of hypothetical example, if $EOS_{ST-TOTAL}$=100 EOS, and $EOS_{ST-USER}$=50 EOS, then $DW_{USER}$ will have exclusive rights to use 50% of the EOS Mainnet network resources: This exclusive usage right exists whether or not $DW_{USER}$ is actually using its 50% of the network resources it is entitled to. Thus, all other EOS Mainnet users that have staked the other 50% of $EOS_{ST-TOTAL}$ are limited to 50% of the EOS Mainnet network resources even if the other 50% is idle. So, when a $DW_{USER}$ has $EOS_{ST-USER}$ but is not using the network resources that the $EOS_{ST-USER}$ entitles $DW_{USER}$ to use then that $EOS_{ST-USER}$ essentially becomes an inefficient allocation of scarce EOS Mainnet network resources.

To address the problem of an inefficient allocation of $EOS_{ST-USER}$ a REX ("Resource EXchange") system exists for the EOS Mainnet. REX is a leasing market for $EOS_{ST-USER}$. REX allows a voting $DW_{USER}$ with EOS available to stake a means to stake an amount of EOS with REX (hereinafter "$EOS_{REX-USER}$") and to receive in exchange an equivalent value of redeemable but non-transferable and non-tradeable REX cryptographic token. (hereinafter "T-REX"). To be eligible to acquire T-REX a $DW_{USER}$ must first have $EOS_{ST-USER}$ and be voting for at least twenty-one block producers or be delegating the $DW_{USER}$ $EOS_{ST-USER}$ votes to a proxy. The amount of staked $EOS_{REX-USER}$ will remain in REX until such amount, or more, are received by $DW_{USER}$ from REX when the T-REX are redeemed by $DW_{USER}$.

By staking the $EOS_{REX-USER}$ with REX instead of just staking with the EOS Mainnet as $EOS_{ST-USER}$ the $DW_{USER}$ makes available to other network users through REX the opportunity to pay EOS leasing fees in exchange for acquiring for a period of time the EOS Mainnet network resource usage rights associated with $EOS_{REX-USER}$. Thus, over time the EOS balance in the REX system increases by the amount of leasing fees paid into REX.

At any time after the T-REX maturity period (which is presently four days) a $DW_{USER}$ can redeem its acquired T-REX for the then equivalent value in EOS. Because the total amount of EOS held by REX will always be greater than or at least equal to the total circulating T-REX there is no risk of loss of value for T-REX, and indeed over time the value of T-REX will increase. Accordingly, a $DW_{USER}$ redeeming their T-REX may receive EOS from REX that is greater in amount than the $EOS_{REX-USER}$ amount originally staked by $DW_{USER}$. The amount of EOS received in excess of the originally staked $EOS_{REX-USER}$ amount will be passive income to $DW_{USER}$.

The preferred exemplary embodiment of the invention deployed on the EOS Mainnet uses the REX system to generate passive EOS income for users of the lending system. A dApp called DCMICROLOAN comprising one or more smart contracts, and a loan database, is deployed and executes on the EOS Mainnet to processes loan creations and payments of EOS between EOS Mainnet users. For each EOS loan payment made towards the outstanding balance of an EOS loan created with the system of the present invention a portion of the EOS loan payment is transferred over as a capital contribution to a system investment fund digital wallet (hereinafter "$DW_{IF}$"). Through execution of a DCMICROLOAN smart contract the EOS capital of $DW_{IF}$ is staked with REX in exchange for T-REX. Periodically through execution of a DCMICROLOAN smart contract the system redeems T-REX from REX in exchange for EOS which will hopefully be greater in amount, but not less than, the amount of EOS originally staked with REX to acquire the T-REX. The excess amount of EOS will be passive income for $DW_{IF}$.

For each EOS loan payment made towards the outstanding balance of an EOS loan created with the system a DCMICROLOAN smart contract s executed such that both the digital wallet of the loan holder ("$DW_{LH}$") and digital wallet of the payor ("$DW_P$") will receive a distribution amount of system utility fund tokens (hereinafter "FT") from a fund token digital wallet ("$DW_{FT}$") of the system. FT can be transferred between EOS Mainnet digital wallets only through execution of a DCMICROLOAN smart contract. Records are created in the loan database of all FT transfers, from which the digital wallets holding FT and the amount of FT can be determined.

Periodically the at least a portion of the EOS passive income of $DW_{IF}$ is assigned as dividends to the network user digital wallets of record that have a balance of FT. The amount of EOS dividend assigned to a network user digital wallet is proportional to the digital wallet balance of FT in relation to the total circulating FT. Thus, participants in the EOS Mainnet blockchain loan system of the present invention where DC loans are at least partially repaid will receive passive income, thus creating an incentive system for both lenders and borrowers of the system.

A more detailed description of the preferred exemplary embodiment for the applicant's P2P blockchain lending system invention is set forth below.

BEST MODE FOR CARRYING OUT THE INVENTION

Figure 1:
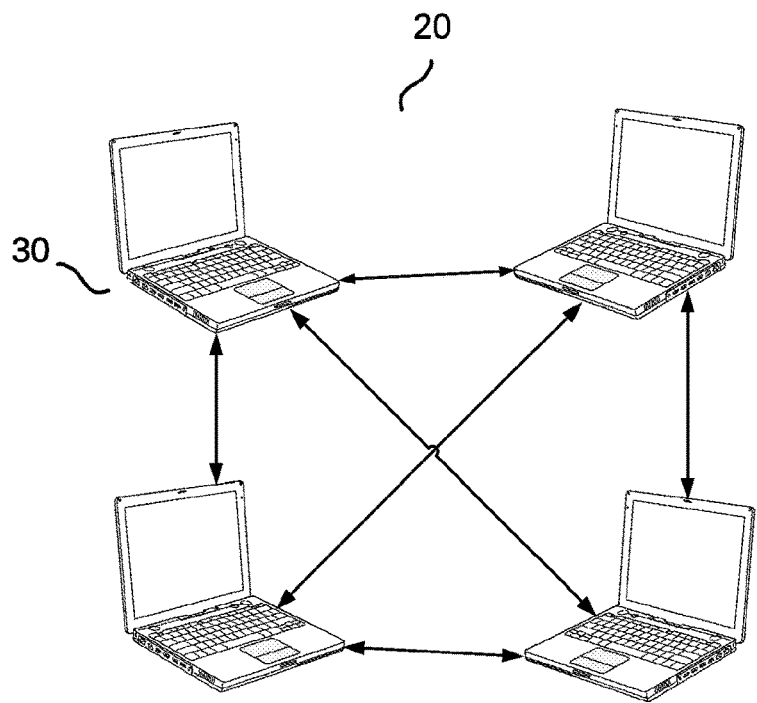
FIG. 1 is a schematic representation of a P2P computer network for using the blockchain loan system of the disclosed invention.
Figure 2:
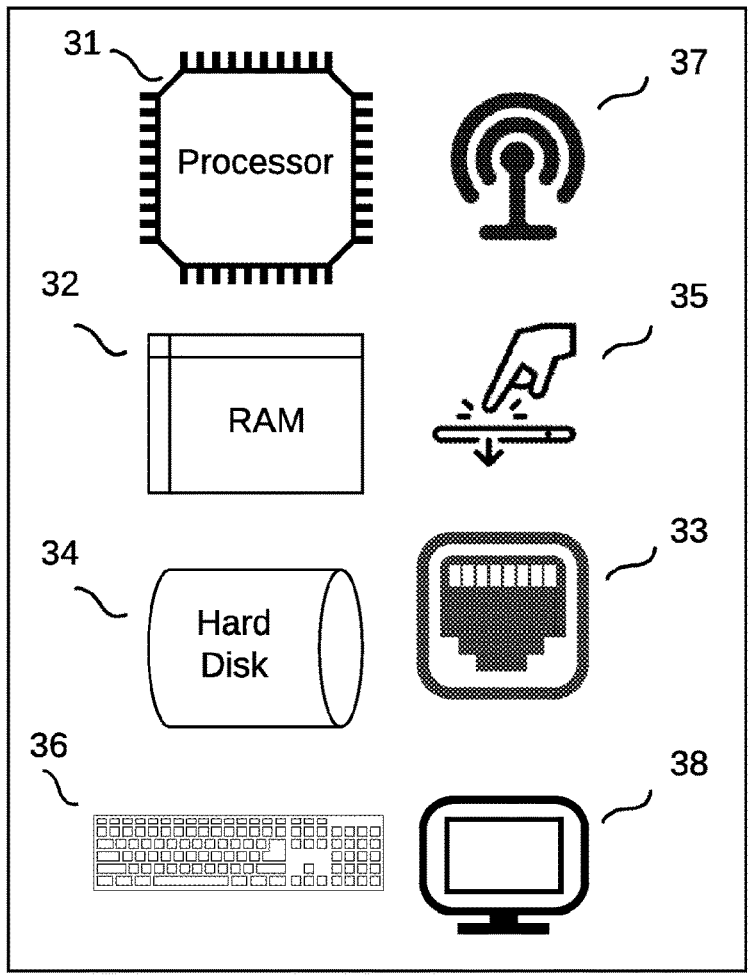
FIG. 2 is a schematic representation of a node of the peer-to-peer computer network of for implementing the blockchain loan system invention.
Figure 3:
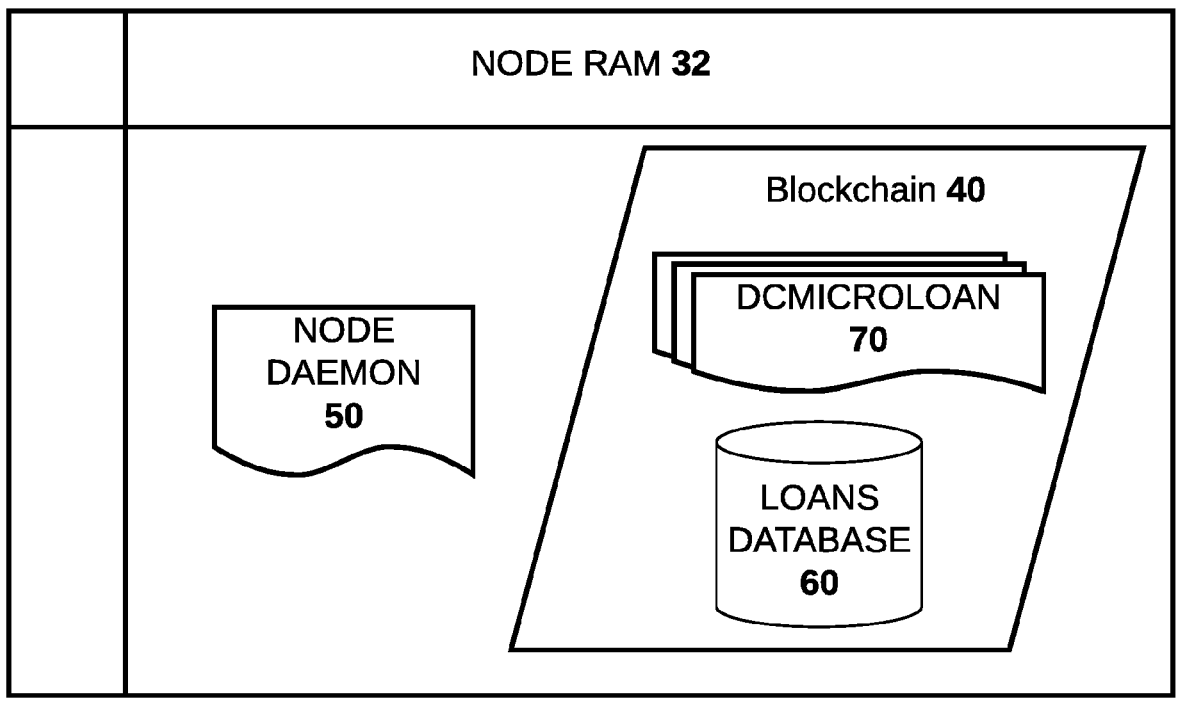
FIG. 3 is a schematic representation of the internal RAM memory a node of the peer-to-peer computer network used for the blockchain loan system invention.

The Blockchain Lending System Invention Architecture:

FIG. 1 is a schematic representation of the P2P blockchain network DC loan creation and payment system 10 of the present invention. Referring to FIG. 2, in the system of the present invention there is a P2P blockchain computer network 20 that is physically comprised of a plurality of computing system network nodes 30 which can communicate directly with each other over an electronic communications network, such as for example the Internet. Referring to FIG. 3 each network node 30 has a computer processor 31, RAM storage memory 32, and a network communications port 33. Each node may also have persistent memory storage 34, a touch panel input mechanism 35, a keyboard input mechanism 36, a radio communications module 37 (e.g. for Wi-Fi network connection), and an output display mechanism 38 (e.g. an LCD display). Each node 30 connected to network 20 is a "peer" in the network meaning that each node 30 can communicate directly with each other node 30 on network 20 without the need for an intermediate central file server. In other words, each node 30 on network 20 can act as both a file server and a client on the network.

Referring to FIG. 3, each peer node 30 on the blockchain P2P network 20 has present in node 30 RAM memory 32 for execution by node processor 31 a software node daemon 50 which is a protocol for P2P blockchain network 20. Node daemon 50 comprises one or more executable computer code files that contain operating instructions to facilitate the connection and participation by node 30 on the blockchain P2P network 20. An administrative node 30 of the system of the present invention may also contain in node memory 32 a loan database 60 which stores data related to the operation and loans of the system of the present invention. Each node 30 of the blockchain P2P blockchain network 20 also contains in node memory 32 a copy of blockchain data file 40.

Figure 4:
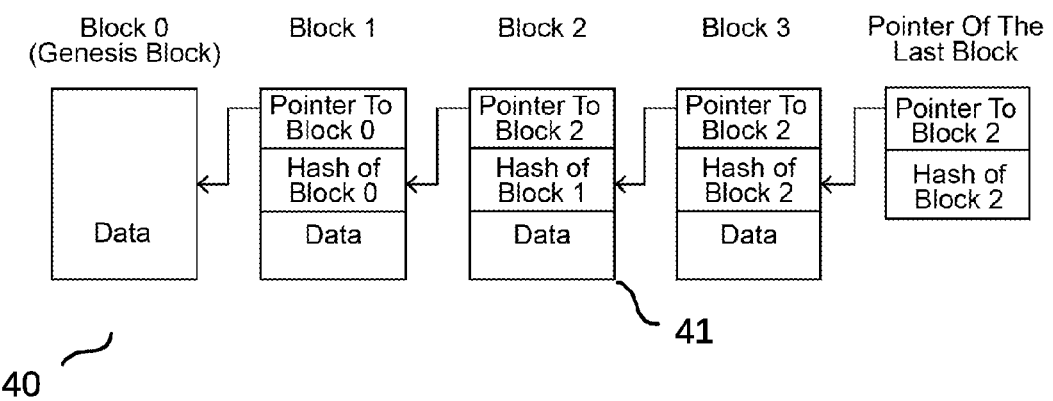
FIG. 4 is a schematic representation of a blockchain data file of the type used in the blockchain loan system invention.

Referring to FIG. 3 each node 30 of the blockchain P2P blockchain network 20 contains in node memory 32 a copy of a blockchain data file 40. FIG. 4 shows blockchain data file 40 as being comprised of cryptographic data blocks 41. Each block 41 contains a cryptographically hashed data set of information and transactions for the blockchain P2P network 20. Each block 41 after the first block (i.e. "genesis block") is linked via a pointer back to the block 41 produced before it. Thus, a plurality of blocks 41 are linked together in sequence to form a "chain" of blocks (i.e. a "blockchain") which will contain all of the transactions for the blockchain P2P network 20. Each new block 41 is produced by a block producing node 30. In the exemplary preferred DPoS EOS P2P public blockchain embodiment of the present invention only elected block producing nodes 30 are allowed to produce blocks. Each elected block producing node 30 takes a turn at being the currently assigned block producing node 30. Each currently assigned block producing node 30 produces blocks for its turn which is a set interval (e.g. presently on the EOS Mainnet a currently assigned block producing turn has an interval of 12 blocks produced which under the current EOS Mainnet protocol takes six seconds). Each new block 41 is published on the blockchain P2P network 20 by the currently assigned block producing node 30 and is added by each node 30 of the P2P blockchain network 20 to its stored copy of the blockchain data file 40. Thus, all nodes 30 in the blockchain network will have a copy of the same blockchain data file 40.

Every user of a P2P blockchain network 20 must have a digital wallet ("DW") to enable the user to conduct transactions on P2P blockchain network 20. A DW stores the unique public and private cryptographic keys that are necessary to interface with P2P blockchain network 20, to conduct transactions, and to check the user balances of DC and other cryptographic tokens (e.g. the FT used in the present invention) on the P2P blockchain network 20. In a preferred embodiment a user of the system utilizes a DW to participate in the system.

In a preferred exemplary embodiment of the system of the present invention the blockchain P2P network 20 is an EOSIO P2P blockchain network comprised of a plurality of nodes 30 where the node daemon 50 includes the core service daemon nodeos. Nodeos is a part of the free open-source EOSIO software suite that is produced by the company Block.one. The nodeos service daemon 50 runs on every node 30 of the EOSIO P2P blockchain network 20 as it contains the P2P protocol needed for nodes 30 to communicate with another. The nodeos service daemon also is configured to process smart contracts, validate transactions, produce blocks containing valid transactions, and add blocks 41 to the blockchain data file 40 of EOSIO P2P blockchain network 20. Each EOSIO P2P blockchain network 20 user of the system of the present invention will have a DW capable of interfacing with the EOSIO P2P blockchain network 20 to conduct transactions in DC EOS and the system FT tokens.

The Loans Database

Figure 6:
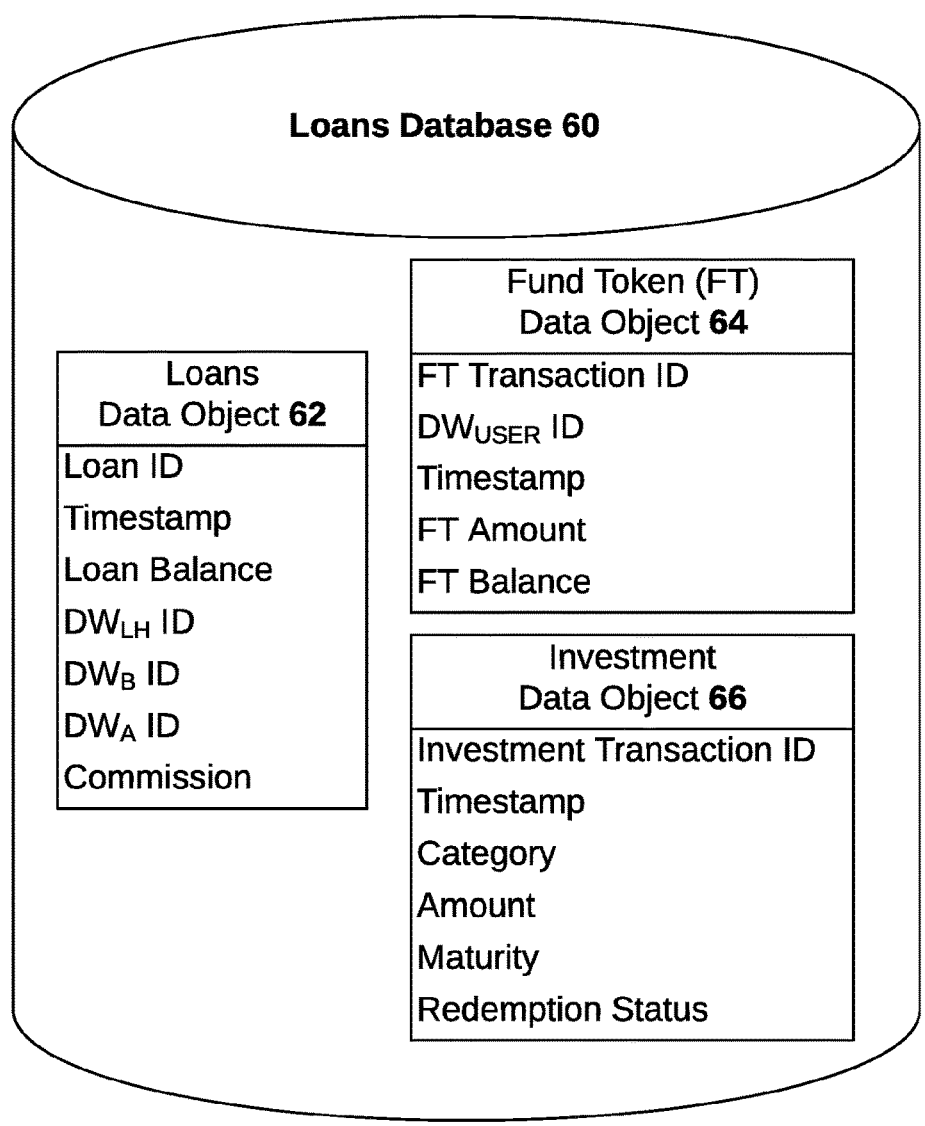
FIG. 6 is a schematic representation of a loan database for a preferred EOS Mainnet embodiment of the blockchain loan system invention.

Referring to FIG. 6 in the exemplary preferred EOSIO P2P blockchain network 200 there is a loans database 60 for storing data of the loan creation and payment system. In some embodiments the transaction data of loans database 60 may be stored as part of the EOS blockchain data file 40 itself. However, for reasons of economy, loans database 60 may be stored off of the blockchain data file 40 in the memory of a system administrator node 30. By way of example and not limitation loans database 60 may be a Mongodb database that is stored in the RAM or persistent storage of one or more administrator nodes 30 which will be accessed and updated through Demux effects and updaters when P2P blockchain network 20 events related to the dApp of the system are being read or executed. Examples of data storage solutions for loans database 60 may also include, by way of example and not limitation, the use of the InterPlanetary File System (IPFS) protocol, vRAM, or DISK.

Referring to FIG. 6 loans database 60 comprises a plurality of instances of data objects (i.e. data structures), each of which is comprised of individual record structures having one or more fields for holding values. In the exemplary EOSIO P2P blockchain network 20 each individual data object may, for example, be declared and instantiated by the EOSIO dApp of the system as a Multi-Index Table. In the illustrated exemplary embodiment loans database 60 comprises an instance of a loans data object 62, fund token data object 64, and DC investment data object 66.

The Loans Data Object 62

Referring to FIG. 6 there is shown a loans data object 62 that contains the records for all loans created with the system of the present invention. There is one record for each loan created. Each record of loans data object 62 has a structure with field values describing the particular loan and its terms.

For each loan record there is contemplated to be a loan ID field with a unique identifier for the loan, a timestamp field that stores a datetime value for the loan creation, and a DC loan balance field that stores a value for the amount in DC of the loan balance that remains outstanding. At loan creation the DC loan balance field holds a value for the full DC amount of the loan. As DC loan payments are made towards the loan the DC loan balance field value will be reduced by the amount of the DC loan payments.

For each loan record there is also contemplated to be a loan holder DW ID field that stores the identifier for the DW of the network user that currently holds the loan (hereinafter "$DW_{LH}$"). In the system of the present invention $DW_{LH}$ of a loan record is the DW that is entitled to receive the proceeds from DC payments made to that DC loan. The $DW_{LH}$ field value of a loan record may be the DW value for the original lender but may also be the DW value of different network user who acquired the loan and its rights to repayment by assignment. Any such assignment of a loan between network users would be processed through a call to the system dApp which would update the loan holder DW ID field value in the loan data object 62 for the loan record with the new $DW_{LH}$ value.

For each loan record there is also contemplated to be a borrower DW ID field that stores the identifier for the DW of the network user that currently owes the loan (hereinafter "$DW_B$"). In the system of the present invention $DW_B$ of a loan record is the DW that is obligated to repay the outstanding balance of the DC loan. The $DW_B$ field value of a loan record may be the DW value for the original borrower but may also be the DW value of different network user who assumed the loan obligation by assignment. Any such assignment of a loan obligation between network users would be processed through a call to the system dApp which would update the borrower DW ID field value in the loan data object 62 for the loan record with the new $DW_B$ value.

For each loan record there is also contemplated to be an agent DW ID field that stores the identifier for the DW of the network user, if any, that is an agent (hereinafter "$DW_A$") for the loan. Such an agent may be an employee of a lender or may be an independent broker for the lender. There may be an arrangement between a lender and agent where $DW_A$ would be entitled to receive DC proceeds from any loan payments towards the loan balance in accordance with a commission value stored in an agent commission field of the loan record in loan data object 62.

For each loan record there is also contemplated to be an administrator fee field that stores a value (e.g. a percentage) for the administrator fee to be transferred from DC proceeds on a loan payment to the DW of the administrator of the system of the present invention (hereinafter "$DW_{SYS}$"). There are contemplated to be expenses associated with establishing, running and maintaining the system of the present invention on any P2P blockchain network and the administrator fee is intended to cover and compensate for the network user who incurs such expenses.

In the illustrated exemplary embodiment of the invention there is no interest expense associated with loans created and repaid through the system, and no minimum payments or repayment schedule. The economic incentive for both the loan holders and payors of the loan in the illustrated embodiment is the potential DC financial rewards associated with participation in the DC investment fund of the system. However, the system of the present invention could also be implemented with interest bearing loans, minimum payment requirements, payment schedules and any other loan terms or conditions. In such embodiments it is contemplated that each loan record of loan data object 62 would include fields for storing values related to these other loan terms and conditions.

The Fund Token Data Object 64

Referring to FIG. 6 there is shown a fund token data object 64 that contains records of the FT transactions for each digital wallet that has received FT. Each FT record of the FT data object 64 has a transaction ID field that holds a unique value for the record. There is also DW ID field that stores a value for the DW assignor or assignee of FT for the transaction. There is an FT amount field that stores the value of FT assigned or received. Upon system deployment a digital wallet for FT (hereinafter "$DW_{FT}$") is created by smart contract DCFUNDTOKEN and assigned a genesis balance of FT (hereinafter "$FT_{GEN}$"). The value for $FT_{GEN}$ of a contemplated preferred embodiment is one billion ($1 \times 10^9$) FT, but $FT_{GEN}$ can be set to any value chosen by the system administrator.

The DC Investment Data Object 66

Referring to FIG. 6 there is shown a DC investment data object 66 that contains a record for each transaction of DC or other cryptographic investment token (hereinafter "IT") of the system investment fund digital wallet DW (hereinafter "$DW_{IF}$"). Each record of the DC investment data object 66 has a transaction ID field that holds a unique value for the record. There is also a timestamp field that stores a datetime value for the $DW_{IF}$ transaction.

There is a category field that stores a value for the category of the $DW_{IF}$ transaction. Contemplated categories include capital contribution (a loan payment portion DC addition to $DW_{IF}$), investment (a payment from $DW_{IF}$ to an investment vehicle such as REX), earnings (an addition to $DW_{IF}$ received from a transaction with an investment vehicle such as REX), and dividend (a subtraction of DC paid as a dividend distribution from $DW_{IF}$ to a $DW_{USER}$ of record in fund token data object 64 having an FT balance).

There is a token field that stores a value for the type of cryptographic token of in the $DW_{IF}$ transaction (e.g. EOS or T-REX). There is a token amount field that stores a value for the transaction amount of token. There is a maturity field which stores a datetime value, as applicable, for when the token of the transaction (e.g. T-REX) is first eligible for redemption of sale. There is a redemption status field which stores a value (i.e. "yes" or "no"), as applicable, indicating whether the token of the transaction has been redeemed or sold.

The Blockchain Lending System Software

Figure 5:
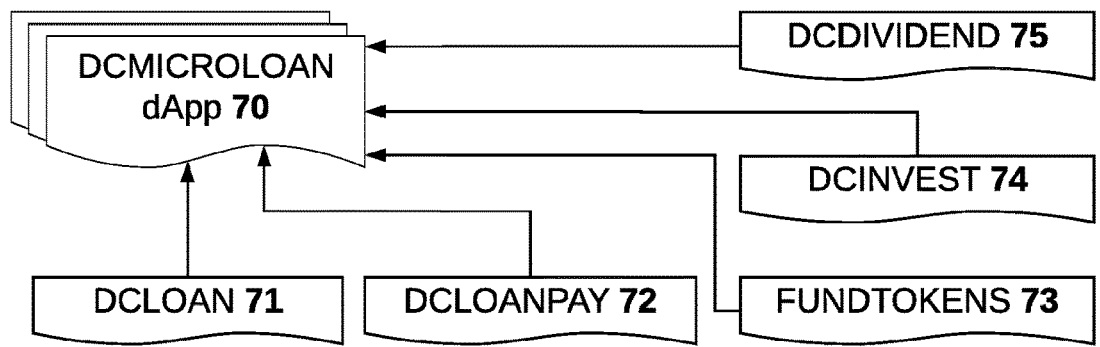
FIG. 5 is a schematic representation of a decentralized software application comprised of "smart contract" code modules for the blockchain loan system invention.

Referring to FIG. 5 it is shown that dApp DCMICROLOAN 70 for the lending system is comprised of one or more code modules that are executable by nodes 30 of P2P blockchain network 20. In the exemplary illustrated embodiment of the present invention the dApp DCMICROLOAN 70 and is built for deployment and execution on EOSIO P2P public blockchain network 20.

DApp DCMICROLOAN 70 of the preferred EOSIO P2P public blockchain network embodiment is comprised of a plurality of WebAssembly (hereinafter "Wasm") code files. The Wasm code files that make up the dApp DCMICROLOAN 70 are DCLOAN 71, DCLOANPAY 72, FUNDTOKENS 73, DCINVEST 74, and DCDIVIDEND 75. It should be noted that these code modules are shown by way of example and not limitation, and that fewer or more code modules, differently named, may also be used. In the preferred embodiment the Wasm code modules are built from source code files that have preferably been authored in the computer language C++ with the EOSIO Contract Development Toolkit. Each code module that makes up dApp DCMICROLOAN 70 is generally referred to as a "smart contract".

DCLOAN 71

Figure 7:
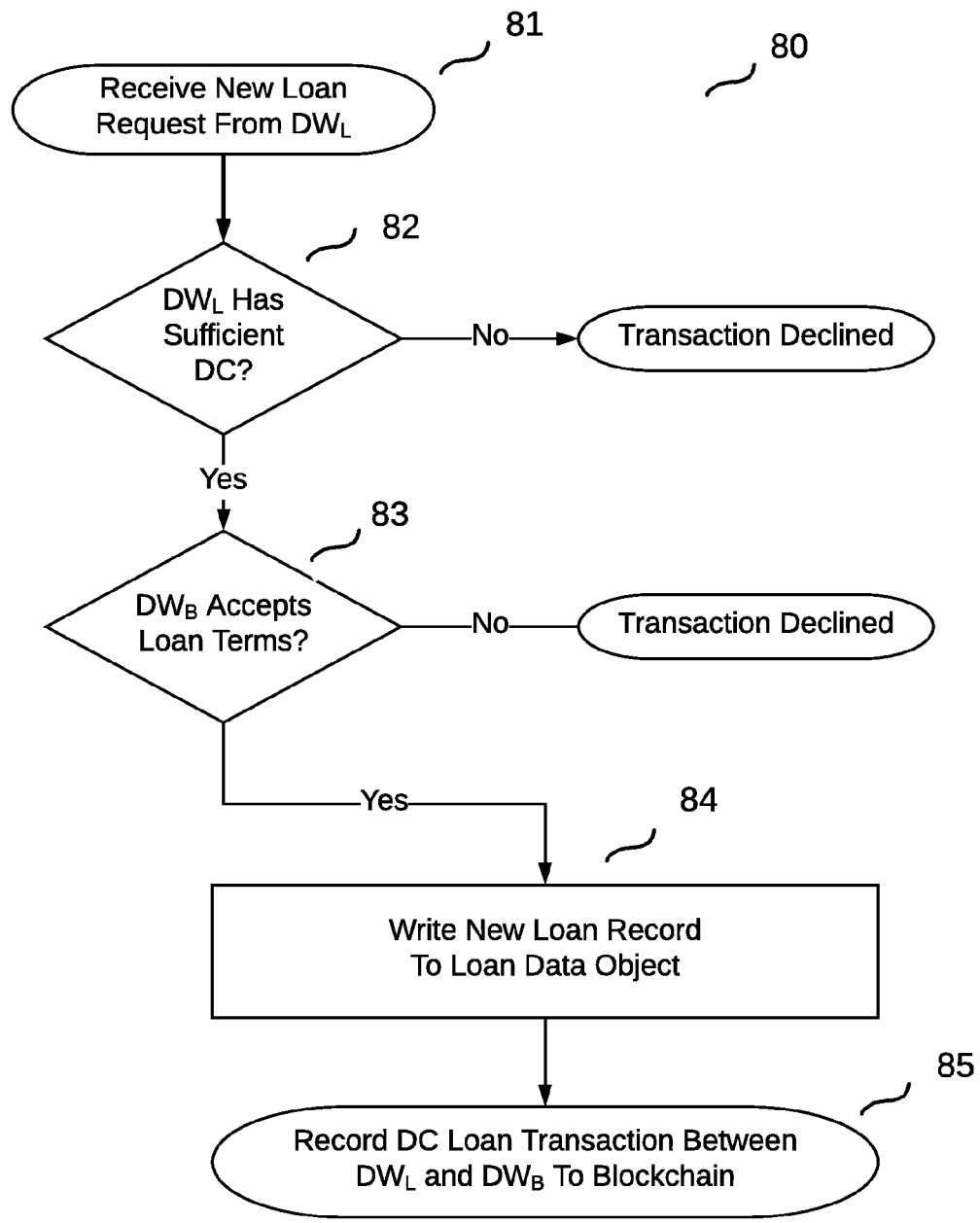
FIG. 7 is a flow chart of the steps with the blockchain loan system invention for recording a new DC loan transaction.

Referring to FIG. 7 the steps performed by system to create a new DC loan with execution of smart contract DCLOAN are shown. Smart contract DCLOAN is deployed and resides in the blockchain data file 40 stored in the memory of nodes 30 of the P2P blockchain network 20. Operating instructions 80 of DCLOAN will be executed by a node 30 of the P2P blockchain network 20 to create a new loan.

DCLOAN has one or more operating instructions 81 to receive a request to create a new loan on certain terms (e.g. amount, term, interest, etc . . . ) from a network user lender having a digital wallet $DW_L$ to a network user borrower having a digital wallet $DW_B$. The one or more operating instructions 81 in DCLOAN will be executed by a node 30 of the P2P blockchain network 20 to receive a request to create a loan from $DW_L$ to $DW_B$ with the communicated terms.

DCLOAN has one or more operating instructions 82 to confirm that $DW_L$ has a sufficient balance of DC to cover the new loan, or else return a message to $DW_L$ and $DW_B$ declining the transaction to create a new loan. The one or more operating instructions 82 in DCLOAN will be executed by a node 30 of the P2P blockchain network 20 to confirm that $DW_L$ has a sufficient balance of DC to cover the new loan, or else return a message to $DW_L$ and $DW_B$ declining the transaction to create a new loan.

DCLOAN has one or more operating instructions 83 to communicate the loan terms to $DW_B$ and confirm acceptance by $DW_B$ of the loan terms, or else return a message to $DW_L$ and $DW_B$ declining the transaction to create a new loan. The one or more operating instructions 82 in DCLOAN will be executed by a node 30 of the P2P blockchain network 20 to confirm acceptance by $DW_B$ of the loan terms, or else return a message to $DW_L$ and $DW_B$ declining the transaction to create a new loan.

DCLOAN also contains one or more operating instructions 84 for creating and populating the fields of a new loan record in loan data object 62 with the new loan information. The one or more operating instructions 84 will be executed by a node 30 of the P2P blockchain network 20 to create a new loan record in loan data object 62 and populate the record fields with the new loan information. The transaction updating the state of loan data object 62 (i.e. updated data set with the new loan record) that results from execution of operating instructions 84 will be included in the next cryptographic block 41 that produced for publication and addition to the blockchain 40.

DCLOAN also contains one or more operating instructions 85 for recording the loan transaction on blockchain 40 including the transfer of a loan amount of DC from the DC balance of $DW_L$ to the DC balance of $DW_B$. The one or more operating instructions 85 will be executed by a node 30 of the P2P blockchain network 20 to record the loan transaction on blockchain 40 including the transfer of a loan amount of DC from the DC balance of $DW_L$ to the DC balance of $DW_B$.

DCLOANPAY 72

Figure 8:
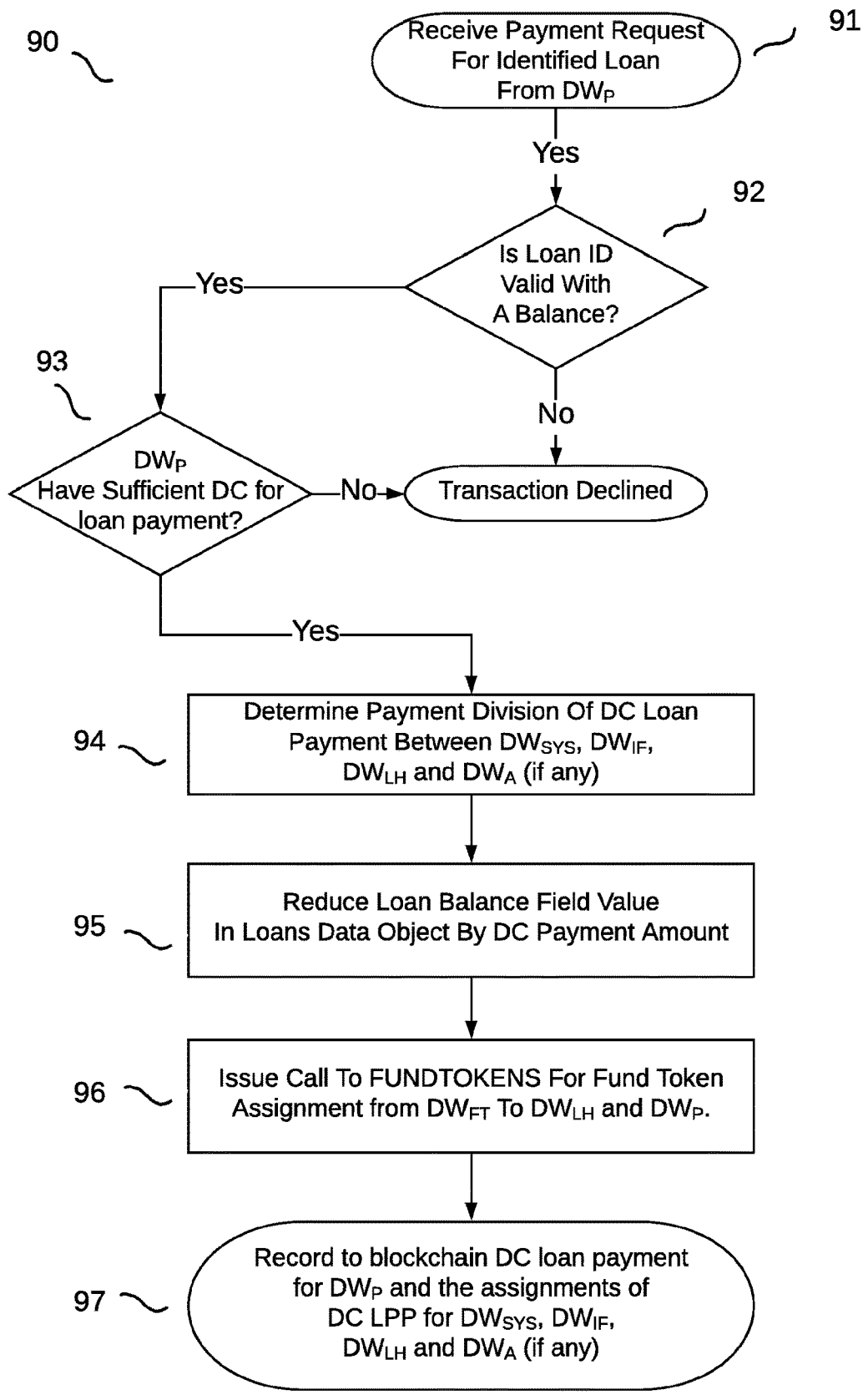
FIG. 8 is a flow chart of the steps with the blockchain loan system invention for recording a new DC loan payment transaction.

FIG. 8 shows the steps 90 performed by the system for processing a loan payment from a network user payor WEB3 digital wallet (hereinafter "$DW_P$") to a network user WEB3 digital wallet of the record loan holder (hereinafter "$DW_{LH}$") to reduce the outstanding loan balance field value for a loan record in loans data object 62. DCLOANPAY is deployed and resides in the blockchain data file 40 stored in the memory of nodes 30 of the P2P blockchain network 20.

DCLOANPAY contains one or more operating instructions 91 for receiving a loan payment request from $DW_P$.

The received loan payment request must communicate data to DCLOANPAY which includes a loan ID and a DC payment amount. The one or more operating instructions 91 will be executed by a node 30 of the P2P blockchain network 20 to receive from $DW_P$ a loan payment request that communicates data to DCLOANPAY which includes a loan ID and a DC payment amount.

DCLOANPAY also contains one or more operating instructions 92 for confirming the existence in loans data object 62 of a record with a loan ID field value matching the loan ID communicated by $DW_P$ and which has a loan balance field value greater than zero but less than or equal to the DC payment amount communicated by $DW_P$, or else return an error message to $DW_P$ declining the transaction. The one or more operating instructions 92 will be executed by the a node 30 of the P2P blockchain network 20 to confirm the existence in loans data object 62 of a record with a loan ID field value matching the loan ID communicated by $DW_P$ and which has a loan balance field value greater than zero but less than or equal to the DC payment amount communicated by $DW_P$, or else return an error message to $DW_P$ declining the transaction.

DCLOANPAY also contains one or more operating instructions 93 for confirming that $DW_P$ has a sufficient balance of DC to cover the DC loan payment amount, or else return an error message declining the transaction. The one or more operating instructions 93 will be executed by a node 30 of the P2P blockchain network 20 to confirm that $DW_P$ has a sufficient balance of DC to cover the DC loan payment amount, or else return an error message declining the transaction.

DCLOANPAY also contains one or more operating instructions 94 for determining a payment division of the DC loan payment amount from $DW_P$ between $DW_{SYS}$, $DW_l$, and $DW_{LH}$ and $DW_A$ (if any) identified in the confirmed loan record. The one or more operating instructions 94 will be executed by a node 30 of the P2P blockchain network 20 to determine a payment division of the DC loan payment amount between $DW_{SYS}$, $DW_l$, and $DW_{LH}$ and $DW_A$ (if any) identified in the confirmed loan record. In a preferred exemplary embodiment, the payment division comprises individual loan payment portions (hereinafter "LPP"):

$LPPD_{DWSys} = 0.5\% * DC$ Loan Payment Amount $LPP_{DWi} = 0.5\% * DC$ Loan Payment Amount $LPP_{DWa}$ = Commission Field Value * DC Loan Payment Amount $LPP_{DWh} = DC$ Loan Payment Amount $- LPP_{DWSys} - LPP_{Dwi} - LPP_{Dwa}$ $LPP_{DWSys} + LPP_{DWi} + LPP_{DWa} + LPP_{DWh} = DC$ Loan Payment Amount Thus, the payment division determined for the DC loan payment amount is comprised of (1) $LPP_{DWSys}$ which is the determined loan payment portion of the DC loan payment amount that will be transferred from $DW_P$ to $DW_{SYS}$; (2) $LPPD_{Wi}$ which is the determined loan payment portion of the DC loan payment amount that will be transferred from $DW_P$ to $DW_l$; (3) $LPP_{DWa}$ which is the determined loan payment portion of the DC loan payment amount that will be transferred from $DW_P$ to the $DW_A$ value of the agent ID field for the confirmed loan record and is calculated from the commission field value of the confirmed loan record; and $LPP_{DWh}$ is the determined loan payment portion of the DC loan payment amount that will be transferred from $DW_P$ to the $DW_{LH}$ value of the loan holder ID field for the loan record.

DCLOANPAY also contains one or more operating instructions 95 for reducing the value of the loan balance field for the confirmed loan record in loan data object 62 by the DC loan payment amount from $DW_P$. The one or more operating instructions 95 will be executed by a node 30 of the P2P blockchain network 20 to reduce the value of the loan balance field for the confirmed loan record in loan data object 62 by the DC loan payment amount from $DW_P$. The updated state (i.e. a data set with new loan balance field value for the confirmed loan record) of loan data object 62 resulting from execution of operating instructions 95 will be included by a block producing node 30 in the next cryptographic block 41 that the node produces for publication and addition to the blockchain 40.

DCLOANPAY also contains one or more operating instructions 96 for communicating to smart contract FUNDTOKENS, with each successfully processed DC loan payment request, a request to distribute system FT. The communicated request must contain data that includes the DC payment amount, $DW_P$ and $DW_{LH}$. The one or more operating instructions 96 will be executed by a node 30 of the P2P blockchain network 20 to communicate to smart contract FUNDTOKENS a request to distribute FT. The communicated request contains data the includes the DC payment amount, $DW_P$ and $DW_{LH}$.

DCLOANPAY also contains one or more operating instructions 97 for recording a transaction of the divisional transfer from $DW_P$ of the DC loan payment amount on blockchain 40 for (1) the transfer from $DW_P$ of the determined $LPP_{DWSys}$ to $DW_{SYS}$; (2) the transfer from $DW_P$ of the determined $LPP_{DWi}$ to $DW_l$; (3) the transfer from $DW_P$ of the determined $LPP_{DWa}$ to $DW_A$; and (4) the transfer from $DW_P$ of the determined $LPP_{DWh}$ to the $DW_{LH}$. The one or more operating instructions 97 will be executed by a node 30 of the P2P blockchain network 20 to record a transaction of the divisional transfer from $DW_P$ of the DC loan payment amount on blockchain 40 for (1) the transfer from $DW_P$ of the determined $LPP_{DWSys}$ to $DW_{SYS}$; (2) the transfer from $DW_P$ of the determined $LPP_{DWi}$ to $DW_l$; (3) the transfer from $DW_P$ of the determined $LPP_{DWa}$ to $DW_A$; and (4) the transfer from $DW_P$ of the determined $LPP_{DWh}$ to the $DW_{LH}$. The updated states $DW_P$, $DW_{LH}$, $DW_{SYS}$, $DW_l$ and $DW_A$ (if any) resulting from execution of operating instructions 97 will be included by a block producing node 30 in the next cryptographic block 41 that the node produces for publication and addition to the blockchain 40.

DCFUNDTOKENS 73

Figure 9:
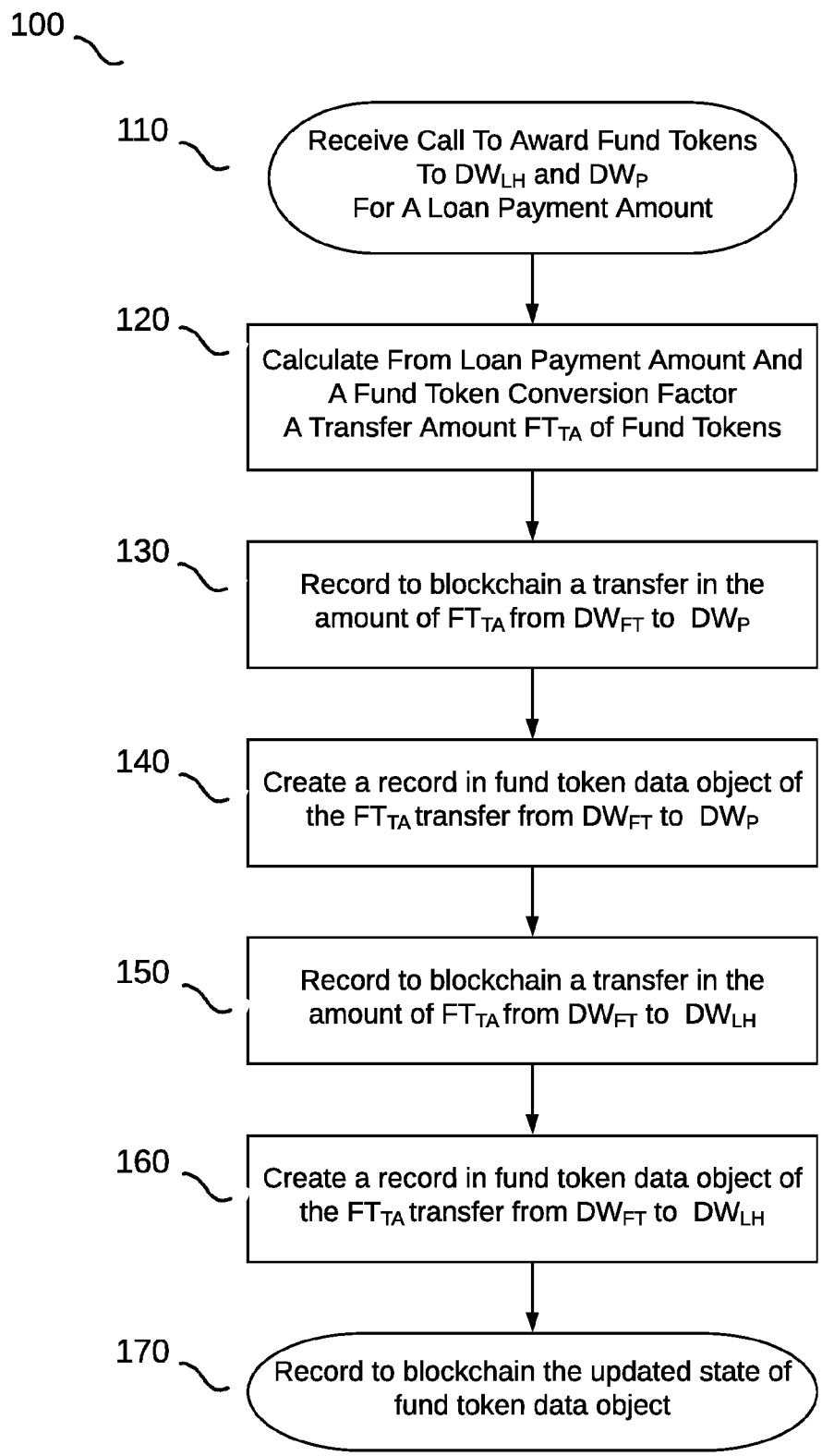
FIG. 9 is a flow chart of the steps with the blockchain loan system invention for assigning fund tokens to the digital wallets of a loan holder and payor.

FIG. 9 shows the steps 100 performed by the system smart contract DCFUNDTOKENS for distributing fund tokens to $DW_{LH}$ and $DW_P$ for a loan when a DC loan payment is made by $DW_P$. Smart contract DCFUNDTOKENS is deployed and resides in the blockchain data file 40 stored in the memory of nodes 30 of the P2P blockchain network 20.

Smart contract FUNDTOKENS contains one or more operating instructions 110 for receiving a communication from smart contract DCLOANPAY 72 data for the DC payment amount, $DW_P$ and $DW_{LH}$. The one or more operating instructions 110 will be executed by a node 30 of the P2P blockchain network 20 to receive a communication from smart contract DCLOANPAY 72 of data for the DC payment amount, $DW_P$ and $DW_{LH}$.

FUNDTOKENS also contains one or more operating instructions 120 for determining an FT transfer amount (hereinafter "$FT_{TA}$") from the input of the DC payment amount and the field value of the $FT_{CONV}$ in the fund token data object 64. In a preferred embodiment the one or more operating instructions 120 will be executed by a node 30 of the P2P blockchain network 20 to determine $FT_{TA}$ as being equal to the product of the DC loan payment amount multiplied by the current field value of $FT_{CONV}$ in the fund token data object 64:

$FT_{TA}$=DC loan payment amount*$FT_{CONV}$

Smart contract FUNDTOKENS of the preferred exemplary embodiment also contains one or more operating instructions 130 for recording a transaction of the transfer of $FT_{TA}$ from $DW_{FT}$ to $DW_P$ on blockchain 40. The one or more operating instructions 130 will be executed by a node 30 of the P2P blockchain network 20 to record a transaction of the transfer of $FT_{TA}$ from $DW_{FT}$ to $DW_P$ on blockchain 40. The updated states $DW_P$ and $DW_{FT}$ resulting from execution of operating instructions 130 will be included by a block producing node 30 in the next cryptographic block 41 that the node produces for publication and addition to the blockchain 40.

The FT balance for a network wallet $DW_{USER}$ on the P2P blockchain network 20 is used to calculate the periodic dividend distribution from $DW_{IF}$ to $DW_{USER}$. In a preferred embodiment a record of each $DW_{USER}$ FT transaction is kept by the system, and FT can only be assigned to a $DW_{USER}$, whether from $DW_{FT}$ or another $DW_{USER}$, through the smart contract FUNDTOKENS. Therefore, for each FT transaction that happens there is a record created by FUNDTOKENS in fund token data object 64. Each such record has a $DW_{USER}$ ID field that stores a value identifying the $DW_{USER}$ (e.g. the public key of $DW_{USER}$) and an FT amount field that stores the value for the amount of FT in the transaction.

Smart contract FUNDTOKENS therefore also contains one or more operating instructions 140 for creating in fund token data object 64 a record of the FT transaction with a DW ID field that stores the identifying value of $DW_P$, and the FT amount field storing the value $FT_{TA}$.

Smart contract FUNDTOKENS of the preferred exemplary embodiment also contains one or more operating instructions 150 for recording a transaction of the transfer of $FT_{TA}$ from $DW_{FT}$ to $DW_{LH}$ on blockchain 40. The one or more operating instructions 150 will be executed by a node 30 of the P2P blockchain network 20 to record a transaction of the transfer of $FT_{TA}$ from $DW_{FT}$ to $DW_{LH}$ on blockchain 40. The updated states $DW_{LH}$ and $DW_{FT}$ resulting from execution of operating instructions 150 will be included by a block producing node 30 in the next cryptographic block 41 that the node produces for publication and addition to the blockchain 40.

Smart contract FUNDTOKENS of the preferred exemplary embodiment also contains one or more operating instructions 160 for creating in fund token data object 64 a record of an FT transaction with a DW ID field that stores the identifying value of $DW_{LH}$, and the FT amount field storing the value $FT_{TA}$.

Smart contract FUNDTOKENS of the preferred exemplary embodiment also contains one or more operating instructions 170 for a block producing node 30 to update the state of fund token data object 64 resulting from execution of operating instructions 140 and 160 in the next cryptographic block 41 that the node produces for publication and addition to the blockchain 40.

DCINVEST 74

Figure 10:
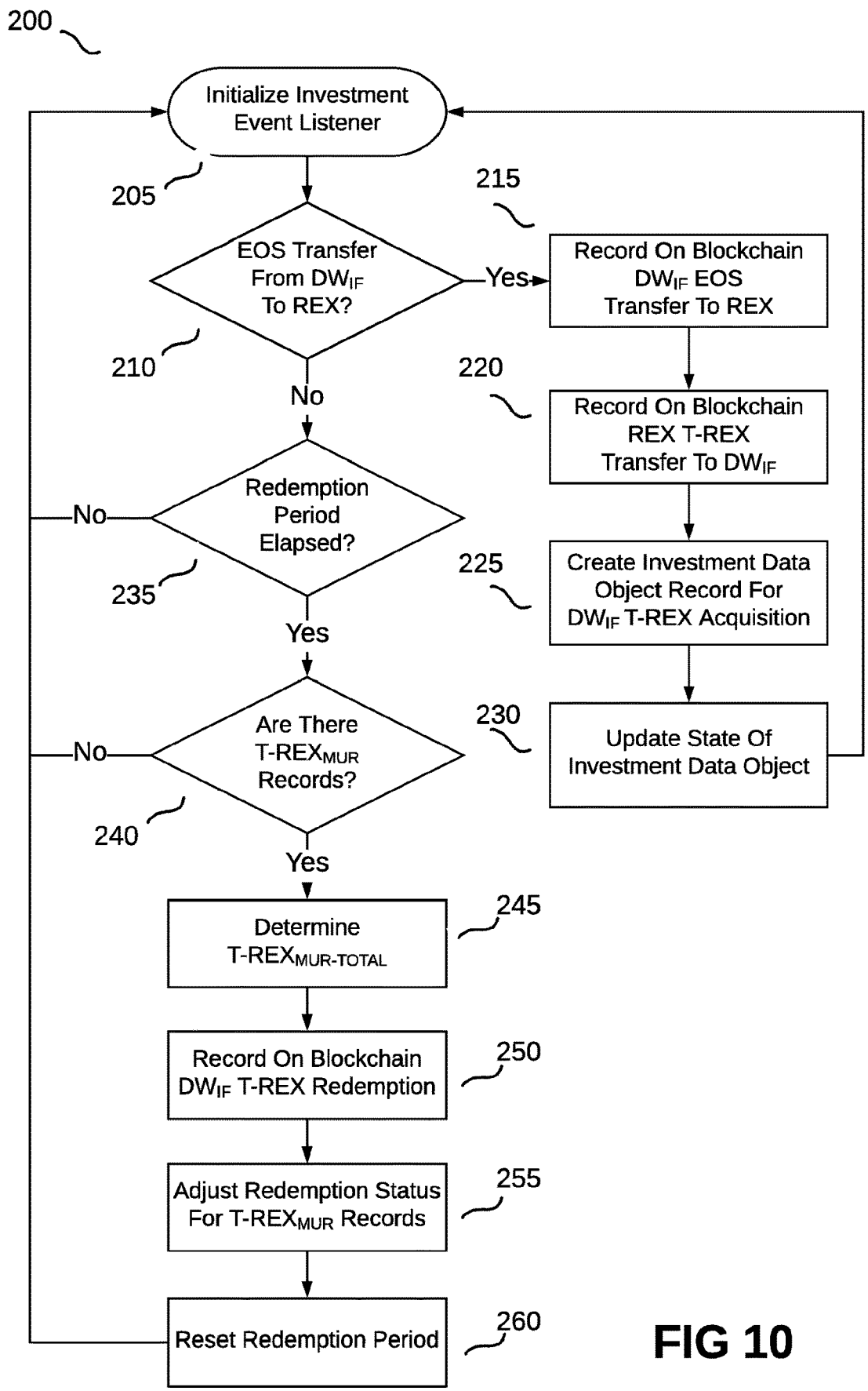
FIG. 10 is a flow chart of the steps with the blockchain loan system invention for investing and redeeming DC EOS with the system investment fund digital wallet.

FIG. 10 shows the steps 200 performed by the smart contract DCINVEST 74 for the investment and earnings of EOS from $DW_{IF}$ when the invention is deployed onto EOS Mainnet 20. Smart contract DCINVEST is deployed and resides in the blockchain 40 stored in the memory of nodes 30 of EOS Mainnet 20.

Smart contract DCINVEST contains one or more operating instructions 205 for initializing an investment event listener for either a request for an EOS transfer from $DW_{IF}$ to REX to acquire T-REX tokens, or a redemption period elapse. The one or more operating instructions 205 will be executed by a node 30 of the EOS Mainnet 20 to initialize an investment event listener for either a request for an EOS transfer from $DW_{IF}$ to REX to acquire T-REX tokens, or a redemption period elapse.

Smart contract DCINVEST contains one or more operating instructions 210 for confirming a request for an EOS transfer from $DW_{IF}$ to REX to acquire T-REX tokens, or else confirming a redemption period elapse. The one or more operating instructions 210 will be executed by a node 30 of the EOS Mainnet 20 to confirm a request for an EOS transfer from $DW_{IF}$ to REX to acquire T-REX tokens, or else confirm a redemption period elapse.

Smart contract DCINVEST contains one or more operating instructions 215 for recording a transaction of the transfer of EOS from $DW_{IF}$ to REX on blockchain 40. The one or more operating instructions 215 will be executed by a node 30 of the EOS Mainnet 20 to record a transaction of the transfer of EOS from $DW_{IF}$ to REX on blockchain 40.

Smart contract DCINVEST contains one or more operating instructions 220 for recording a transaction of the transfer of T-REX from REX to $DW_{IF}$ on blockchain 40. The one or more operating instructions 220 will be executed by a node 30 of the EOS Mainnet 20 to record a transaction of the transfer of T-REX from REX to $DW_{IF}$ on blockchain 40.

Smart contract DCINVEST contains one or more operating instructions 225 for creating a record in investment data object 66 of the transfer of T-REX from REX to $DW_{IF}$, including setting the field values for amount, maturity, and redemption status. The one or more operating instructions 225 will be executed by a node 30 of the EOS Mainnet 20 to create a record in investment data object 66 of the transfer of T-REX from REX to $DW_{IF}$, including but not limited to setting the field values for amount, maturity, and redemption status.

Smart contract DCINVEST contains one or more operating instructions 230 for updating the state for the investment data object 66 (i.e. the new T-REX transaction record) on blockchain 40 and reinitializing the investment event listener. The one or more operating instructions 230 will be executed by a node 30 of the EOS Mainnet 20 to update the state for the investment data object 66 (i.e. the new T-REX transaction record) on blockchain 40 and reinitialize the investment event listener.

Smart contract DCINVEST contains one or more operating instructions 235 for confirming a redemption period elapse, or else reinitializing the investment event listener. The one or more operating instructions 235 will be executed by a node 30 of the EOS Mainnet 20 to confirm a redemption period elapse, or else reinitialize the investment event listener.

Smart contract DCINVEST contains one or more operating instructions 240 for confirming that investment data object 66 has one or more records of a transaction for T-REX that has a maturity field datetime value that has passed, and also has a redemption status field value of empty or "no" (hereinafter any such Mature and UnRedeemed T-REX record being referred to as "T-REX$_{MUR}$"), or else reinitializing the investment event listener. The one or more operating instructions 240 will be executed by a node 30 of the EOS Mainnet 20 to confirm that investment data object 66 has one or more T-REX$_{MUR}$ records, or else reinitialize the investment event listener.

Smart contract DCINVEST also contains one or more operating instructions 245 for determining the total amount of mature and unredeemed T-REX (hereinafter "T-REX$_{MUR\text{-}TOTAL}$") as being equal to the sum of the token amount field values for the T-REX$_{MUR}$ records that were identified from execution of the one or more operating instructions 240. The one or more operating instructions 230 will be executed by a node 30 of EOS Mainnet 20 to determine a T-REX$_{MUR\text{-}TOTAL}$ as being equal to the sum of the token amount field values for the T-REX$_{MUR}$ records that were identified from execution of the one or more operating instructions 240.

Smart contract DCINVEST also contains one or more operating instructions 245 for recording on blockchain 40 a redemption assignment from DW$_{IF}$ to REX of T-REX tokens in an amount equal to T-REX$_{MUR\text{-}TOTAL}$ in exchange for receiving from REX an amount EOS$_{REX\text{-}RDM}$ of EOS. The one or more operating instructions 245 will be executed by a node 30 of the EOS Mainnet 20 to record on blockchain 40 a redemption assignment of T-REX from DW$_{IF}$ to REX in an amount T-REX$_{MUR\text{-}TOTAL}$ and assignment to DW$_{IF}$ from REX an amount EOS$_{REX\text{-}RDM}$ of EOS.

Smart contract DCINVEST also contains one or more operating instructions 250 for, upon a redemption assignment from DW$_{IF}$ to REX of T-REX$_{MUR\text{-}TOTAL}$, adjusting the redemption status field value to "yes" for each of the T-REX$_{MUR}$ records in investment data object 66 that were identified from execution of the one or more operating instructions 240. The one or more operating instructions 250 will be executed by a node 30 of the EOS Mainnet 20 to, upon a redemption assignment from DW$_{IF}$ to REX of T-REX$_{MUR\text{-}TOTAL}$, adjust the redemption status field value to "yes" for each of the T-REX$_{MUR}$ records in investment data object 66 that were identified from execution of the one or more operating instructions 240. The updated state of investment data object 66 resulting from execution of operating instructions 250 will be included by a block producing node 30 in the next cryptographic block 41 that the node produces for publication and addition to the blockchain 40.

Smart contract DCINVEST contains one or more operating instructions 260 for, after a redemption assignment from DW$_{IF}$ to REX of T-REX$_{MUR\text{-}TOTAL}$, resetting the redemption period and reinitializing the investment event listener of the one or more operating instruction 205. The one or more operating instructions 260 will be executed by a node 30 of EOS Mainnet 20 after a redemption assignment from DW$_{IF}$ to REX of T-REX$_{MUR\text{-}TOTAL}$ to reset the redemption period and reinitialize the investment event listener of the one or more operating instruction 205.

DCDIVIDEND 75

Figure 11:
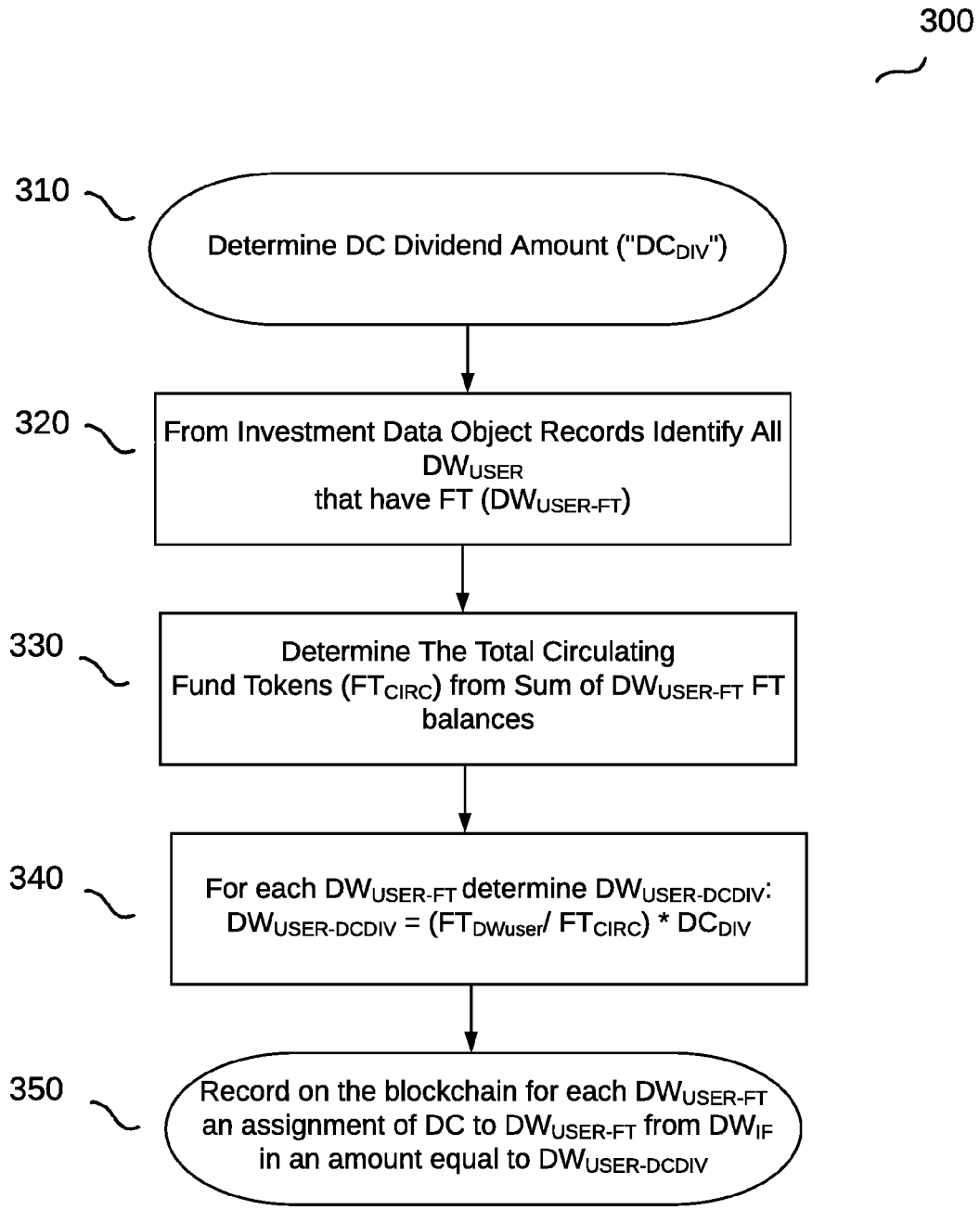
FIG. 11 is a flow chart of the steps with the blockchain loan system invention for paying a DC dividend with the system investment fund digital wallet to system user digital wallets that have a balance of system fund tokens.
Figure 12:
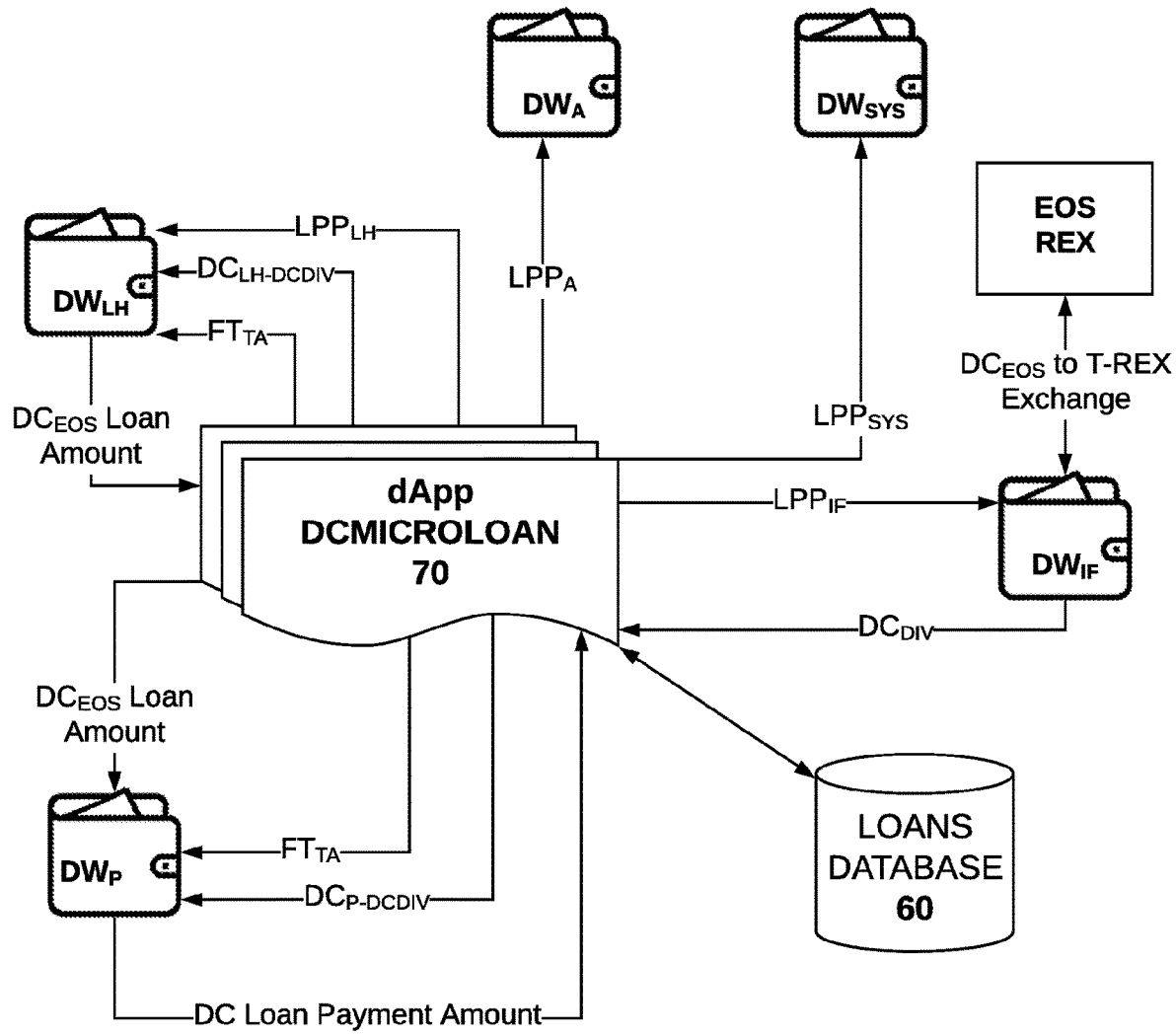
FIG. 12 is a schematic representation of the blockchain loan system invention where $DW_{LH}$ is the original lender and $DW_P$ is the original borrower.

FIG. 11 shows the steps 300 performed by the smart contract DCDIVIDEND for assigning a dividend amount of DC (hereinafter "DC$_{DIC}$") to the network user digital wallets of record in fund token data object 64 that have a balance of FT. DC$_{DIV}$ is an amount of DC that is set by the system to be calculated as being equal to a predetermined portion of the DC passive income for DW$_{IF}$. In a preferred embodiment DC$_{DIV}$ is calculated as being equal to 50% of the DC passive income for DW$_{IF}$. However, any percentage of DC passive income for DW$_{IF}$ may be used. In the preferred embodiment smart contract DCDIVIDEND is deployed and resides in the blockchain 40 stored in the memory of nodes 30 of EOS Mainnet 20.

Smart contract DCDIVIDEND contains one or more operating instructions 310 for determining at a predetermined time the DC$_{DIV}$ to pay out to the network user digital wallets of record in fund token data object 64 that have a balance of FT. The predetermined dividend time in a preferred EOS Mainnet embodiment is every twenty-four hours, however this may be set to any time interval. The one or more operating instructions 310 will be executed by a node 30 of the EOS Mainnet 20 at a predetermined dividend time to determine the DC$_{DIV}$ to pay out to the network user digital wallets of record in fund token data object 64 that have a balance of FT.

Smart contract DCDIVIDEND also contains one or more operating instructions 320 for identifying at the predetermined time from fund token data object 64 each digital wallet having an FT balance field value greater than zero (hereinafter "DW$_{USER\text{-}FT}$"), and summing the FT balances for all DW$_{USER\text{-}FT}$ records to determine a value for the circulating FT circulation value (hereinafter "FT$_{CIRC}$"). The one or more operating instructions 320 will be executed by a node 30 of the EOS Mainnet 20 at the predetermined time to identify from fund token data object 64 each digital wallet having an FT balance field value greater than zero (hereinafter "DW$_{USER\text{-}FT}$"), and summing the FT balances for all DW$_{USER\text{-}FT}$ records to determine a value for the circulating FT circulation value (hereinafter "FT$_{CIRC}$").

Smart contract DCDIVIDEND also contains one or more operating instructions 330 to calculate at the predetermined time for each DW$_{USER\text{-}FT}$ a DC dividend distribution (hereinafter "DW$_{USER\text{-}DCDIV}$") that is equal to the product of the dividend amount multiplied times the FT percentage that DW$_{USER\text{-}FT}$ has of FT$_{CIRC}$. Thus, for example, if dividend amount=one hundred (100) EOS, FT$_{CIRC}$=one thousand (1000), and DW$_{USER\text{-}FT}$ has an FT balance field value of one hundred (100), then DW$_{USER\text{-}DIV}$ would be equal to ten (10) EOS:

$$DW_{USER\text{-}DCDIV} = [DW_{USER\text{-}FTBAL}/FT_{CIRC}]*\text{Dividend Amount}$$

$$DW_{USER\text{-}DCDIV} = [100/1000]*100 \text{ EOS}$$

$$DW_{USER\text{-}DCDIV} = [0.1]*100 \text{ EOS}$$

$$DW_{USER\text{-}DCDIV} = 10 \text{ EOS}$$

The one or more operating instructions 330 will be executed by a node 30 of the EOS Mainnet 20 at the predetermined time to calculate for each DW$_{USER\text{-}FT}$ a DC dividend distribution (hereinafter "DW$_{USER\text{-}DCDIV}$") that is equal to the product of the dividend amount multiplied times the FT percentage that DW$_{USER\text{-}FT}$ has of FT$_{CIRC}$.

Smart contract DCINVEST also contains one or more operating instructions 340 for recording on blockchain 40 for each determined DW$_{USER\text{-}DCDIV}$ an assignment from DW$_{IF}$ of the DW$_{USER\text{-}DCDIV}$ amount of EOS to DW$_{USER}$. The one or more operating instructions 340 will be executed by a node 30 of the EOS Mainnet 20 to record on blockchain 40 for each determined DW$_{USER\text{-}DCDIV}$ an assignment from DW$_{IF}$ of the DW$_{USER\text{-}DCDIV}$ amount of EOS to DW$_{USER}$.

While particular embodiments and applications of the present blockchain cryptocurrency loan system invention have been shown and described changes and modifications may be made, and the appended claims are to encompass within their scope all such changes and modifications as are within the true spirit and scope of the invention.

The invention claimed is:

1. A blockchain digital cryptocurrency loan system comprising:
- a system node comprising a computer processor electronically connected to a computer-readable system storage medium and to a network communications port, the system node arranged in a blockchain network comprising a plurality of nodes;
- a node daemon in said system storage medium having one or more operating instructions for the system node to electronically communicate peer-to-peer using said network communications port with one or more network user nodes of the plurality of nodes in the blockchain network;
- a system digital wallet $DW_{SYS}$ in said system storage medium;
- an investment fund digital wallet $DW_{IF}$ in said system storage medium;
- a fund token digital wallet $DW_{FT}$ in said system storage medium;
- a loans database in said system storage medium;
- a blockchain data file in said system storage medium;
- an executable loans application in said system storage medium comprising:
  - (i) at least one operating instruction which, when executed by the system node, causes the system node to cryptographically record to said blockchain data file a loan assignment of digital cryptocurrency in a loan amount from a lender digital wallet $DW_L$ to a borrower digital wallet $DW_B$ based on a request from at least one user associated with at least one network user node of the one or more network user nodes;
  - (ii) at least one operating instruction which, when executed by the system node, causes the system node to create a record in said loans database of said loan assignment, the record comprising a record structure comprising a loan ID field, a loan holder ID field, a borrower ID field, and a loan balance field;
  - (iii) at least one operating instruction which, when executed by the system node, causes the system node to receive a loan payment request from a payor digital wallet $DW_P$, said loan payment request including data comprising a loan ID value and a loan payment amount value;
  - (iv) at least one operating instruction which, when executed by the system node, causes the system node to locate a loan record in the loans database based on receiving the loan payment request, the loan record having a loan ID field value that equals the loan ID value of the loan payment request and a loan balance field value greater than zero;
  - (v) at least one operating instruction which, when executed by the system node, causes the system node to determine a payment division of the loan payment amount value between $DW_{SYS}$, $DW_{IF}$, and a loan holder digital wallet $DW_{LH}$ of the loan holder ID field of the loan record;
  - (vi) at least one operating instruction which, when executed by the system node, causes the system node to cryptographically record to the blockchain data file a loan payment assignment of digital cryptocurrency in the loan payment amount value from $DW_P$ to $DW_{SYS}$, $DW_{IF}$, and $DW_{LH}$ in accordance with the determined payment division, such that a first portion of the loan payment amount value is allocated from $DW_P$ to $DW_{SYS}$, a second portion of the loan payment amount value is allocated from $DW_P$ to $DW_{IF}$, and a third portion of the loan payment amount value is allocated from $DW_P$ to $DW_{LH}$;
  - (vii) at least one operating instruction which, when executed by the system node, causes the system node to reduce the loan balance field value of the loan record by the loan payment amount value based on the loan payment request;
  - (viii) at least one operating instruction which, when executed by the system node, causes the system node to cryptographically record to the blockchain data file a transfer amount of fund tokens from $DW_{FT}$ to both $DW_P$ and $DW_{LH}$ based on recording the loan payment assignment;
  - (ix) at least one operating instruction which, when executed by the system node, causes the system node to cryptographically record to the blockchain data file at a predetermined time an assignment of a digital cryptocurrency dividend distribution from $DW_{IF}$ to each participating digital wallet in the blockchain network having a fund token balance greater than zero;
  - (x) at least one operating instruction which, when executed by the system node, causes the system node to confirm an elapse of an investment token redemption period;
  - (xi) at least one operating instruction which, when executed by the system node, causes the system node to confirm that an investment data object in the loans database has a record of an acquisition transaction of an investment token that has a maturity field datetime value that has passed, and also has a redemption status field value of no;
  - (xii) at least one operating instruction which, when executed by the system node, causes the system node to determine from the loans database a total amount of mature and unredeemed investment token ITMUR-TOTAL assigned to $DW_{IF}$;
  - (xiii) at least one operating instruction which, when executed by the system node, causes the system node to cryptographically record to the blockchain data file a redemption transaction comprising an assignment from $DW_{IF}$ to a token exchange of an ITMUR-TOTAL amount of an investment token and an assignment from the token exchange to $DW_{IF}$ of an equivalent value amount of digital cryptocurrency;
  - (xiv) at least one operating instruction which, when executed by the system node, causes the system node to adjust the redemption status field value to yes for a record in an investment data object; and
  - (xv) at least one operating instruction which, when executed by the system node, causes the system node to reset the investment token redemption period.

2. The blockchain digital cryptocurrency loan system of claim 1 where:
- (i) said loans database also includes an agent field and a commission field;
- (ii) said at least one operating instruction to cause the system node to determine a payment division determines a division of the loan payment amount value between $DW_{SYS}$, $DW_{IF}$, the loan holder digital wallet $DW_{LH}$ of the loan holder ID field of the loan record, and an agent digital wallet $DW_A$ of the agent field of the loan record in accordance with a value of the commission field of the loan record; and
- (iii) said at least one operating instruction to cause the system node to cryptographically record to the blockchain data file a loan payment assignment of digital cryptocurrency in the loan payment amount value is from $DW_P$ to $DW_{SYS}$, $DW_{IF}$, $DW_{LH}$, and $DW_A$ in accordance with the determined payment division.

3. The blockchain digital cryptocurrency loan system of claim 1 where the digital cryptocurrency dividend distribution from $DW_{IF}$ to a particular network user with a digital wallet $DW_{USER}$ will equal a percentage of a determined dividend amount that equals the percentage of circulating fund tokens assigned to $DW_{USER}$.

4. The blockchain digital cryptocurrency loan system of claim 1 where the transfer amount of fund tokens from $DW_{FT}$ to both $DW_P$ and $DW_{LH}$ is equal in amount to the loan payment amount value.

5. The blockchain digital cryptocurrency loan system of claim 1 where the executable loans application further comprises:
   (i) at least one operating instruction which, when executed by the system node, causes the system node to confirm a request for a digital cryptocurrency transfer from $DW_{IF}$ to a token exchange for an acquisition amount of an investment token;
   (ii) at least one operating instruction which, when executed by the system node, causes the system node to cryptographically record to the blockchain data file an acquisition transaction comprising a digital cryptocurrency acquisition assignment from $DW_{IF}$ to a token exchange and a return assignment from the token exchange to $DW_{IF}$ of an acquisition amount of the investment token; and
   (iii) at least one operating instruction which, when executed by the system node, causes the system node to create a record of the acquisition transaction in an investment data object of the loans database, including setting an amount field value to the acquisition amount, a maturity field value to a datetime after which the acquisition amount of the investment token may be redeemed, and a redemption status field value to no.

6. The blockchain digital cryptocurrency loan system of claim 1 where said digital cryptocurrency is transferable using a proof-of-stake protocol.

7. The blockchain digital cryptocurrency loan system of claim 5 where said digital cryptocurrency is transferable using a proof-of-stake protocol, said token exchange is a Resource Exchange, and said investment token is transferable through the Resource Exchange.

8. The blockchain digital cryptocurrency loan system of claim 1 where said digital cryptocurrency is transferable using a proof-of-stake protocol, said token exchange is a Resource Exchange, and said investment token is transferable through the Resource Exchange.

9. A blockchain digital cryptocurrency loan method involving a system node comprising a computer processor electronically connected to a computer-readable system storage medium and to a network communications port, the system node arranged in a blockchain network comprising a plurality of nodes, the method comprising:
   storing, with the system node in the system storage medium, a system digital wallet $DW_{SYS}$, an investment fund digital wallet $DW_{IF}$, a fund token digital wallet $DW_{FT}$, a loans database, a blockchain data file, and an executable loans application;
   cryptographically recording, with the system node, to said blockchain data file a loan assignment of digital cryptocurrency in a loan amount from a lender digital wallet $DW_L$ to a borrower digital wallet $D_WB$ based on a request from at least one user associated with at least one network user node of one or more network user nodes;
   creating, with the system node, a record in said loans database of said loan assignment, the record comprising a record structure comprising a loan ID field, a loan holder ID field, a borrower ID field, and a loan balance field;
   receiving, by the system node, a loan payment request from a payor digital wallet $DW_P$, said loan payment request including data comprising a loan ID value and a loan payment amount value;
   locating, by the system node, a loan record in the loans database based on receiving the loan payment request, the loan record having a loan ID field value that equals the loan ID value of the loan payment request and a loan balance field value greater than zero;
   determining, by the system node, a payment division of the loan payment amount value between $DW_{SYS}$, $DW_{IF}$, and a loan holder digital wallet $DW_{LH}$ of the loan holder ID field of the loan record;
   cryptographically recording, with the system node, to the blockchain data file a loan payment assignment of digital cryptocurrency in the loan payment amount value from $DW_P$ to $DW_{SYS}$, $D_{WIF}$, and $DW_{LH}$ in accordance with the determined payment division, such that a first portion of the loan payment amount value is allocate$_P$ from $DW_P$ tO $DW_{SYS}$, a second portion of the loan payment amount value is allocated from DWp to $D_W$ip, and a third portion of the loan payment amount value is allocated from $DW_P$ to $DW_{LH}$;
   reducing, with the system node, the loan balance field value of the loan record by the loan payment amount based on the loan payment request;
   cryptographically recording, with the system node, to the blockchain data file a transfer amount of fund tokens from $DW_{FT}$ to both $DW_P$ and $DW_{LH}$ based on recording the loan payment assignment;
   cryptographically recording, with the system node, to the blockchain data file at a predetermined time an assignment of a digital cryptocurrency dividend distribution from $DW_{IF}$ to each participating digital wallet in the blockchain network having a fund token balance greater than zero;
   confirming, with the system node, an elapse of an investment token redemption period;
   confirming, with the system node, that an investment data object in the loans database has a record of an acquisition transaction of an investment token that has a maturity field datetime value that has passed, and also has a redemption status field value of no;
   determining, with the system node from the loans database, a total amount of mature and unredeemed investment token ITMUR-TOTAL assigned to $DW_{IF}$;
   cryptographically recording, with the system node to the blockchain data file, a redemption transaction comprising an assignment from $DW_{IF}$ to a token exchange of an ITMUR-TOTAL amount of an investment token and an assignment from the token exchange to $DW_{IF}$ of an equivalent value amount of digital cryptocurrency;
   adjusting, with the system node, the redemption status field value to yes for a record in an investment data object; and
   resetting, with the system node, the investment token redemption period.

* * * * *

UNITED STATES PATENT AND TRADEMARK OFFICE
CERTIFICATE OF CORRECTION

PATENT NO. : 11,798,073 B2
APPLICATION NO. : 17/415607
DATED : October 24, 2023
INVENTOR(S) : Maurice Vanegas et al.

It is certified that error appears in the above-identified patent and that said Letters Patent is hereby corrected as shown below:

In the Claims

Column 17, Line 62, Claim 1, delete "DWp" and insert -- $DW_P$ --

Column 19, Line 12, Claim 4, delete "$DW_{FT}$to" and insert -- $DW_{FT}$ to --

Column 19, Line 66, Claim 9, delete "$D_WB$" and insert -- $DW_B$ --

Column 20, Line 24, Claim 9, delete "$D_{WIF}$," and insert -- $DW_{IF}$, --

Column 20, Line 27, Claim 9, delete "allocate$_P$" and insert -- allocated --

Column 20, Line 27, Claim 9, delete "tO" and insert -- to --

Column 20, Lines 28-29, Claim 9, delete "DWp to $D_w$ip," and insert -- $DW_P$ to $DW_{IF}$, --

Signed and Sealed this
Twenty-third Day of January, 2024

*Katherine Kelly Vidal*

Katherine Kelly Vidal
*Director of the United States Patent and Trademark Office*